No. 797,690. PATENTED AUG. 22 1905.
J. W. KENNEDY.
TURPENTINE GATHERING DEVICE.
APPLICATION FILED DEC. 28, 1904
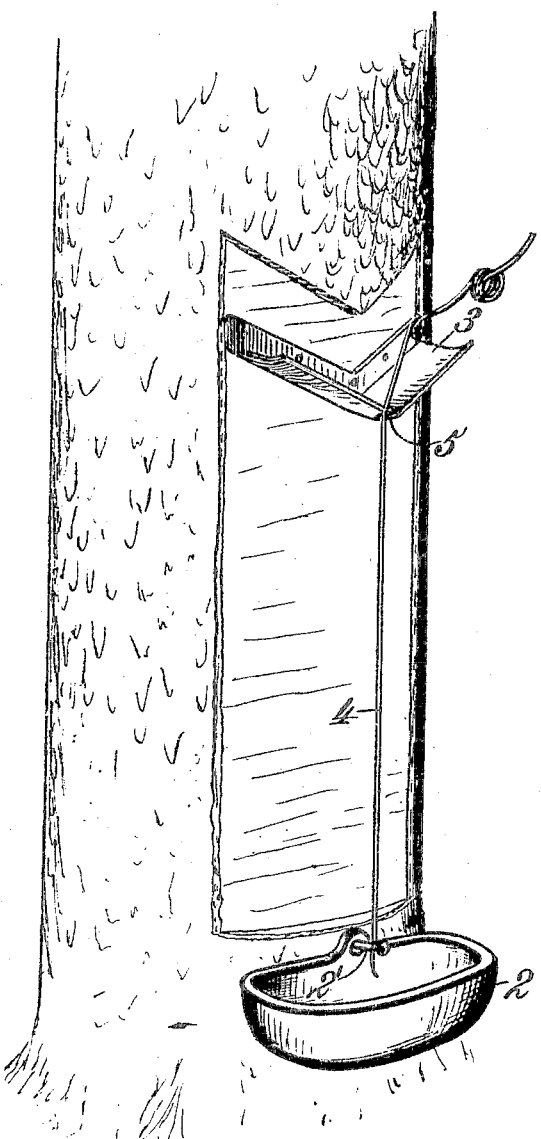
Witnesses
Robert Pruitt
James L. Norris, Jr.
Inventor
John W. Kennedy,
By James L. Norris
Atty.

UNITED STATES PATENT OFFICE.

JOHN W. KENNEDY, OF CECIL, GEORGIA, ASSIGNOR OF ONE-HALF TO JOHN W. SPURLOCK, OF TIFTON, GEORGIA.

TURPENTINE-GATHERING DEVICE.

No. 797,690.     Specification of Letters Patent.     Patented Aug. 22, 1905.

Application filed December 28, 1904. Serial No. 238,646.

*To all whom it may concern:*

Be it known that I, JOHN W. KENNEDY, a citizen of the United States, residing at Cecil, in the county of Berrien and State of Georgia, have invented new and useful Improvements in Turpentine-Gathering Devices, of which the following is a specification.

This invention relates to a turpentine-gathering device.

Ordinarily devices of this character involve a vessel or cup provided with a lip or spout, the lip or spout being fitted into a kerf or groove formed in the tree or being otherwise connected with the tree and serving to direct the gum or crude turpentine which exudes from the tree into the vessel or cup. In other cases the cup and lip are made separate. In both of these devices of the ordinary character the cup or vessel has to be moved up the tree as the same is successively blazed. This is disadvantageous, as the vessel or cup will eventually be so high as to render the scooping of the contents of the vessel therefrom a difficult matter. When the vessel or cup gets at an unusual height, recourse must be had to a ladder to dip the contents therefrom. I separate the lip or spout and the vessel or cup and attach the latter to a tree, and it remains permanently in place; but the lip or spout is elevated in order to receive fresh supplies of gum. I provide means for conducting the gum from the lip or spout to the vessel or cup, no matter what the distance may be separating these parts, and the gum is thus conducted in such a manner that no loss of the substance ensues nor does it become dirty or discolored. The conducting means in the present case consists of a wire, which I have found very satisfactory, although I do not limit myself to this particular article for securing the result set forth.

In order to indicate the advantages of the invention, I have represented a simple adaptation involving the same in the accompanying drawing, the latter being in perspective and showing a vessel, a spout, and a conducting means between the two, the said vessel and spout being somewhat separated.

The vessel illustrated is designated by 2, and it may be made of earthenware, cast metal, or any other desired material. It is represented as being somewhat semioval in shape, but the form is not essential. The vessel is adapted to be connected to a tree near the ground, and for this purpose any suitable means may be provided—for example, I may drive a nail, as 2', through an upwardly-extending ear on the inner wall of the vessel. As hereinbefore indicated, the vessel 2 remains permanently in place. The position of the vessel may be near the ground or at a higher point, if desired. When near the ground, however, the gum within the vessel can be more readily dipped therefrom.

The lip or spout forming part of the device may be of any character. The one represented is designated by 3. I have found sheet metal as satisfactory for the construction of the said lip or spout and ordinarily make it of substantially V form, the front and rear sides when the spout is connected to a tree being flanged. The spout may be connected to the tree by means of nails or other fastenings driven through what might be considered the rear flange thereof. What might be considered the forward flange prevents the gum from flowing over the forward side of the lip.

As will be understood from the foregoing, the lip or spout is moved step by step up the tree, as is the custom in the gathering of turpentine, while the vessel or cup remains in the position in which it was originally set, and I provide a means for conducting the turpentine-gum from the lip to the vessel, and I do this in such a way that the gum will not be discolored or be wasted. Besides this, the gum is conducted from the lip or spout to the pan in a rapid manner. The means illustrated for conducting the gum from the spout to the vessel is a wire, as 4. The wire when in operation stands perfectly straight or vertical and is preferably taut. It may be coiled one or more times near its lower end about the nail 2', while its extreme lower end points directly into the pan 2. The upper portion of the wire may be coiled several times around one of the fastenings or nails that unite the spout to the tree. In the forward portion of the lip, at the junction of its branches or sides, is an opening or perforation 5, and the wire between its ends passes through this opening or perforation. The spout being connected with the tree and the latter being hacked, chipped, or scarified above the spout, the crude gum will be caused to enter the spout and flow along the same toward the opening, and will then pass onto the wire, down which it flows, being directed by the wire or the extreme free end thereof into the pan 2. When it becomes necessary to elevate the spout, the upper end of the wire will be disengaged therefrom, following which the spout will be elevated, after which enough material will be uncoiled from the upper end of the wire to compensate for the increase in height of the spout. The operation will then be as before.

When I use the word "permanent" herein as applied to the location of the pan or vessel, I mean permanent with respect to the spout, for it is not essential that the pan or vessel should remain absolutely in a fixed position. It may be located near the ground, or it may be elevated a short distance from the ground, to suit the convenience of a user. The idea in the use of the word "permanent" is that it is not necessary to elevate the pan or vessel as the spout is moved step by step up a tree.

The turpentine-gathering device is simple in construction. The parts thereof can be readily and quickly brought into working relation and when in such relation assure the gathering of a product of high grade.

Having thus described my invention, what I claim, and desire to secure by Letters Patent, is—

1. In a turpentine-gathering device, the combination with a lip adapted to be elevated by steps up a tree, and a pan separate from the lip and adapted to be fixedly secured to the tree in a permanent relation, and a wire separated from the tree for conducting the crude gum from the lip to the pan in the different vertical positions of said lip.

2. In a turpentine-gathering device, the combination with a lip and a pan separate from the lip, and a wire arranged to deliver gum from the lip to the pan, the former having an opening through which the wire extends.

3. In a turpentine-gathering device, the combination with a lip having an opening and a pan separate from the lip, a nail to fasten the pan to a tree, a wire, the upper portion of which extends through said opening, the upper end of the wire being connected with the lip, and the lower portion of the wire being coiled about said nail and the lower end of the wire being free and pointing in to the pan.

In testimony whereof I have hereunto set my hand in presence of two subscribing witnesses.

JOHN W. KENNEDY.

Witnesses:
R. T. KENNEDY,
T. B. FUTCH.